(12) United States Patent
De Gentile et al.

(10) Patent No.: US 10,932,555 B2
(45) Date of Patent: Mar. 2, 2021

(54) ORAL CARE APPLIANCE AND A METHOD FOR CONTROLLING PRESSURE THEREIN

(71) Applicant: Willo 32 SAS, Limoges (FR)

(72) Inventors: Hugo De Gentile, Feytiat (FR); Alexandre Georges Gabriel Laurent, Brooklyn, NY (US); Jil Abed Michel Chabaro, Antony (FR)

(73) Assignee: Willo 32 SAS, Limoges (FR)

( * ) Notice: Subject to any disclaimer, the term of this patent is extended or adjusted under 35 U.S.C. 154(b) by 0 days.

(21) Appl. No.: 16/269,987

(22) Filed: Feb. 7, 2019

(65) Prior Publication Data

US 2020/0253369 A1 Aug. 13, 2020

(51) Int. Cl.
*A61C 17/22* (2006.01)
*A46B 15/00* (2006.01)

(52) U.S. Cl.
CPC ...... *A46B 15/0012* (2013.01); *A46B 15/0008* (2013.01); *A61C 17/228* (2013.01)

(58) Field of Classification Search
CPC ....... A61C 17/16; A61C 17/22; A61C 17/221; A61C 17/222; A61C 17/225; A61C 17/227; A61C 17/30; A61C 17/32; A61C 17/38; A61B 15/0012; A61B 2200/1066
See application file for complete search history.

(56) References Cited

U.S. PATENT DOCUMENTS

| 3,527,218 | A | * | 9/1970 | Westine | A61C 17/0211 |
| | | | | | 433/80 |
| 4,164,940 | A | * | 8/1979 | Quinby | A61H 13/00 |
| | | | | | 433/216 |
| 4,223,417 | A | * | 9/1980 | Solow | A46B 9/045 |
| | | | | | 15/167.2 |
| 4,346,492 | A | * | 8/1982 | Solow | A46B 7/06 |
| | | | | | 15/22.1 |
| 4,795,347 | A | * | 1/1989 | Maurer | A46B 7/06 |
| | | | | | 15/167.2 |
| 5,327,608 | A | * | 7/1994 | Kosakewich | A46B 7/02 |
| | | | | | 15/167.1 |
| 5,493,747 | A | * | 2/1996 | Inakagata | A61C 17/3418 |
| | | | | | 15/22.1 |
| 7,082,638 | B2 | | 8/2006 | Koh | |
| 7,537,451 | B1 | | 5/2009 | Ramnarine | |

(Continued)

FOREIGN PATENT DOCUMENTS

| EP | 2654609 B1 | 3/2018 |
| EP | 2654611 B1 | 4/2018 |

(Continued)

OTHER PUBLICATIONS

International Search Report and Written Opinion dated Apr. 17, 2020 from International Application No. PCT/IB2020/050840, 12 pages.

*Primary Examiner* — Ralph A Lewis

(74) *Attorney, Agent, or Firm* — Daylight Law, P.C.

(57) ABSTRACT

An oral care appliance and a method of controlling pressure in the oral care appliance are disclosed. The pressure inside a mouthpiece of the oral care appliance is controlled by an actuator. The actuator is triggered when a targeted threshold value of an operational characteristic is reached. Automatic control of the pressure in the mouthpiece enhances both cleaning efficiency and user comfort.

21 Claims, 5 Drawing Sheets

(56) References Cited

U.S. PATENT DOCUMENTS

| | | | |
|---|---|---|---|
| 8,341,790 B2 * | 1/2013 | Van Baren | A61C 17/222 15/22.1 |
| 8,359,692 B2 * | 1/2013 | Brewer | A46B 9/045 15/167.2 |
| 8,448,282 B2 | 5/2013 | Stapelbroek | |
| 8,572,790 B2 * | 11/2013 | Jousma | A61C 17/20 15/167.1 |
| 8,578,539 B2 * | 11/2013 | Jousma | A61C 17/222 15/167.1 |
| 8,617,090 B2 * | 12/2013 | Fougere | A61C 17/0211 601/160 |
| 8,635,731 B2 | 1/2014 | Garner | |
| 8,667,634 B2 | 3/2014 | Steur | |
| 8,677,541 B2 * | 3/2014 | Meadows | A61C 17/0211 15/22.1 |
| 8,745,802 B2 | 6/2014 | Steur | |
| 8,863,346 B2 | 10/2014 | Headstrom | |
| 8,978,189 B1 | 3/2015 | Sexton | |
| 8,990,992 B2 | 3/2015 | Stapelbroek | |
| 9,084,655 B2 | 7/2015 | Sahoo | |
| 9,277,980 B2 | 3/2016 | Leveling | |
| 9,308,065 B2 | 4/2016 | Steiner | |
| 9,504,542 B2 * | 11/2016 | De Gentile | A61C 17/0211 |
| 9,526,597 B2 | 12/2016 | Steur | |
| 9,636,195 B2 | 5/2017 | Wolpo | |
| 9,636,197 B2 | 5/2017 | Khangura | |
| 9,668,840 B2 | 6/2017 | Miller | |
| 9,907,633 B2 | 3/2018 | Wolpo | |
| 10,420,633 B2 * | 9/2019 | Pierce | A61C 17/224 |
| 2007/0184404 A1 | 8/2007 | Johnki | |
| 2015/0024340 A1 | 1/2015 | Gentile | |
| 2016/0113745 A1 | 4/2016 | Golub | |
| 2016/0135581 A1 | 5/2016 | Pai | |
| 2016/0206415 A1 | 7/2016 | Kraft | |
| 2016/0270892 A1 | 9/2016 | Yoo | |
| 2017/0007383 A1 | 1/2017 | Blank et al. | |
| 2017/0367801 A1 | 12/2017 | Fitzgerald | |
| 2018/0000573 A1 | 1/2018 | Miller | |
| 2018/0098832 A1 * | 4/2018 | Pierce | A61C 17/221 |
| 2018/0184795 A1 | 7/2018 | Pai | |
| 2018/0184857 A1 | 7/2018 | Pai | |
| 2018/0368957 A1 | 12/2018 | Hyun | |
| 2019/0231499 A1 | 8/2019 | Laurent et al. | |

FOREIGN PATENT DOCUMENTS

| | | |
|---|---|---|
| WO | 2017061980 A1 | 4/2017 |
| WO | 2017146366 A1 | 8/2017 |
| WO | 2018160986 A1 | 9/2018 |
| WO | 2018199760 A1 | 12/2018 |

* cited by examiner

ORAL CARE APPLIANCE AND A METHOD FOR CONTROLLING PRESSURE THEREIN

BACKGROUND OF THE INVENTION

Dental cleaning plays a significant role in impacting the overall health of an individual. Many people schedule frequent visits to a dentist for regular check-up and cleaning operations. Many devices have been developed over the years to achieve the purpose of oral hygiene. These devices are either electrical or non-electrical. Among the above-mentioned categories of dental cleaning devices, electric dental units have gained popularity. Some examples of electric dental units are electric toothbrushes, water picks and electric flosses which intend to provide cleaning results by eradicating the food remains, plaque, etc. from the spaces in between the teeth. These devices tend to require less user intervention in their operation and some are also suitable for people with reduced mobility or people on the move for whom it is difficult to use a traditional toothbrush. However, it is necessary to provide and improve existing dental units for ensuring satisfactory cleaning results.

In order for existing devices to be effective, a high level of consumer compliance with techniques and/or instructions for using the electrical dental cleaning devices is required. Also, the user is required to manipulate the device on various regions of the oral cavity for performing the cleaning action. To overcome this drawback, dental cleaning devices come with various control systems. But again, the efficiency of these control systems is questionable during various situations. For example, these electronically controlled cleaning devices do not properly work in case of ill-fitting or misplacement of the mouthpiece in the mouth of the user. These may take a longer period of time to attain the required cleaning action on the teeth or may provide improper dental cleaning to the user. Sometimes they may cause discomfort to the user as the mouthpiece is set to operate for longer periods of time to complete its cleaning action.

SUMMARY OF THE INVENTION

Specific embodiments of the present invention disclosed herein relate to an oral care appliance and a method for controlling pressure of an oral care appliance during a brushing cycle. Specifically, the presently disclosed subject matter is concerned with different control modes applied in the oral care appliance for controlling contractions and relaxations of a mouthpiece of the oral care appliance by regulating the pressure inside the mouthpiece.

Specific embodiments of the present invention provide a solution to overcome one or more of the above-mentioned problems with an oral care appliance. Moreover, specific embodiments of the present invention provide an easy to maintain and convenient oral care appliance to improve the dental health of a user by improving the effectiveness and user satisfaction of such oral care appliances and systems.

Thus, specific embodiments of the invention allow for a reduction in the time dedicated to oral hygiene and to brushing to just a few seconds and significantly increases its efficiency. Specific embodiments of the invention also provide a smart control system to operate the oral care appliance with more efficiency and regularity to overcome the existing drawbacks of dental cleaning devices.

In specific embodiments of the invention, an oral care appliance for cleaning the teeth of a user and a method for controlling pressure in the oral care appliance are disclosed. The oral care appliance may be utilized for cleaning, whitening and in other general oral care applications.

In specific embodiments of the invention, the oral care appliance comprises a mouthpiece configured to deform in response to pressure variations inside a cavity during a brushing cycle. The cavity is formed by at least a portion of the mouthpiece. The brushing cycle comprises at least one contraction phase and at least one relaxation phase of the mouthpiece. The oral care appliance also comprises an actuator configured to control at least one of the contraction phase and the relaxation phase by regulating the pressure inside the cavity. The actuator is triggered when at least one operational characteristic reaches a targeted threshold value.

In specific embodiments of the invention, the cavity is a closed or nearly closed space between the mouthpiece and a dental arch of the user. In other words, the cavity is formed between the mouthpiece and dental arch of the user when the mouthpiece is applied in the mouth of the user.

In specific embodiments of the invention, the cavity is formed inside the mouthpiece when the mouthpiece is an inflatable mouthpiece. In specific embodiments of the invention, the cavity is enclosed inside the mouthpiece.

In specific embodiments of the invention, the mouthpiece comprises a flexible membrane configured to deform in response to pressure variations in the cavity.

In specific embodiments of the invention, the brushing cycle comprises at least one contraction phase and at least one relaxation phase of the mouthpiece; the contraction phase being a phase where the volume of the cavity decreases and the relaxation phase being a phase where the volume of the cavity increases. The contraction phase and the relaxation phase of the mouthpiece are provided to perform the cleaning action of the oral care appliance. The brushing cycle can be repeated one or more times as per the requirements.

In specific embodiments of the invention, the at least one contraction phase and the at least one relaxation phase of the mouthpiece is achieved by increasing or decreasing the pressure, thus the volume inside the cavity.

In specific embodiments of the invention, the number of occurrences of each contraction phase and each relaxation phase in the brushing cycle may be the same or vary according to the user input or a selected control mode for the oral care appliance or as per the requirements or any pre-set value.

In specific embodiments of the invention, a cleaning agent can be supplied into the mouthpiece during a brushing cycle to achieve the cleaning action.

The cleaning agent can be selected from the group of, but not limited to, liquid, solid, powder, emulsion, gels, fluid, or a combination thereof.

In specific embodiments of the invention, the pressure inside the cavity is varied by means for varying pressure.

In specific embodiments of the invention, the actuator controls one of a pump, a depression chamber, a valve mechanism or a combination thereof.

In specific embodiments of the invention, the invention provides the actuator to control at least one of the contraction phase and the relaxation phase by regulating the pressure inside the cavity. The actuator is an electronic system with one or more components in it, that can be selected from at least one sensor, timer or a combination thereof. The actuator can be configured to monitor the at least one operational characteristic in the oral care appliance.

In specific embodiments of the invention, the operational characteristic can be selected from a plurality of operational characteristics comprising pressure, volume, flow rate, time, and user input.

In specific embodiments of the invention, the actuator triggers a means for varying pressure when the at least one operational characteristic reaches the targeted threshold value. The actuator can trigger the means for varying pressure by controlling the opening or closing of a valve, controlling the activation or deactivation of a pump, or controlling the activation or deactivation of a vacuum.

In specific embodiments of the invention, the actuator triggers the means for varying pressure when one targeted threshold of at least one operational characteristic is reached, whichever occurs first.

In specific embodiments of the invention, the operational characteristics are selected in accordance with a control mode of the oral care appliance.

In specific embodiments of the invention, the oral care appliance can be pre-programmed to automatically perform the at least one brushing cycle in a predefined sequence in accordance with at least one default cycle based on one or more control modes, wherein the control modes comprise a time-controlled mode, a volume-controlled mode, a pressure-controlled mode, a frequency-controlled mode, a user-specific mode, or a combination thereof.

In specific embodiments of the invention, the volume-controlled mode is used, wherein the operational characteristic selected to be monitored is the volume of fluid (air or liquid) injected into the cavity or the volume of fluid extracted from the cavity. The actuator triggers the means for varying pressure when the targeted threshold value of the volume is sensed. In the pressure-controlled mode, the actuator triggers the means for varying pressure when the targeted threshold value of the pressure is sensed. Similarly, in the time-controlled mode, the actuator triggers the means for varying pressure when the targeted threshold time is reached.

In specific embodiments of the invention, the mode selected is a smart depression mode which is a combination of the time-controlled mode and the pressure-controlled mode.

In specific embodiments of the invention a method of controlling pressure in an oral care appliance is disclosed. The method comprises varying pressure inside a cavity to deform a mouthpiece during a brushing cycle. The cavity is formed by at least a portion of the mouthpiece. The brushing cycle comprises at least one contraction phase and at least one relaxation phase of the mouthpiece. The method also comprises regulating the pressure inside the cavity to control at least one of the contraction phase and the relaxation phase. An actuator is triggered to regulate the pressure inside the cavity when at least one operational characteristic reaches a targeted threshold value.

In specific embodiments of the invention a cleaning agent is provided into the mouthpiece to achieve required oral hygiene. The cleaning agent can be aspirated into the mouthpiece during the brushing cycle.

In specific embodiments of the invention the actuator additionally controls an injection system able to inject any of a liquid, a solid or a gas or a combination thereof into the mouth of the user.

In specific embodiments of the invention the actuator is triggered to control the volume of cleaning agent injected into the mouthpiece during the brushing cycle.

In specific embodiments of the invention the actuator is triggered to extract waste from the user's mouth when the at least one operational characteristic reaches the targeted threshold value.

In specific embodiments of the invention the components of the actuator such as a sensor and a timer work collaboratively to control the pressure inside the cavity.

In specific embodiments of the invention the actuator regulates the opening and closing of the means for varying pressure in the oral care appliance.

Various objects, features, aspects and advantages of the present disclosure will become more apparent from the following detailed description of preferred embodiments, along with the accompanying drawing figures in which like numerals represent like features.

DETAILED DESCRIPTION OF THE INVENTION

Aspects of the present invention can be understood by reference to the figures and description set forth herein. However, the following descriptions, and numerous specific details thereof, are given by way of illustration and not of limitation. Many changes and modifications to the specific descriptions may be made without departing from the spirit and scope thereof, and the present invention includes all such modifications. It is to be understood that the embodiments may or may not overlap with each other. Thus, part of one embodiment, or specific embodiments thereof, may or may not fall within the ambit of another, or specific embodiments thereof, and vice versa.

Figure 1:
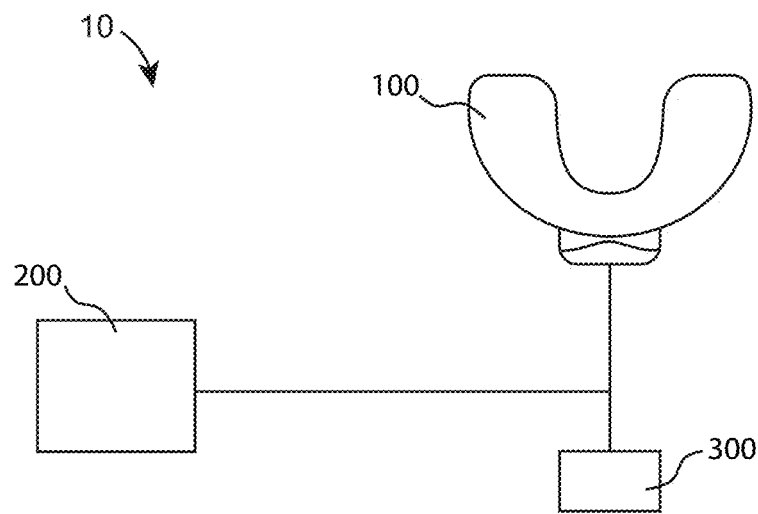
FIG. 1 illustrates an oral care appliance 10 in accordance with specific embodiments of the present invention.

FIG. 1 illustrates an oral care appliance 10 according to the presently disclosed subject matter. The oral care appliance 10 comprises a mouthpiece 100 configured to deform in response to pressure variations inside a cavity during a brushing cycle, wherein the brushing cycle comprises at least one contraction phase and at least one relaxation phase of the mouthpiece 100. The volume of the cavity can increase or decrease depending on the pressure variations inside the cavity. The oral care appliance 10 further comprises a means for varying pressure 200 inside the cavity and an actuator 300 to control at least one of the contraction phase and the relaxation phase by regulating the pressure inside the cavity, wherein the actuator 300 is triggered when at least one operational characteristic reaches a targeted threshold value. In what follows, the term "ambient pressure" therefore relates to the pressure outside the cavity (i.e., in the mouth of the user when the mouthpiece 100 is inserted in the mouth of the user).

Figure 2:
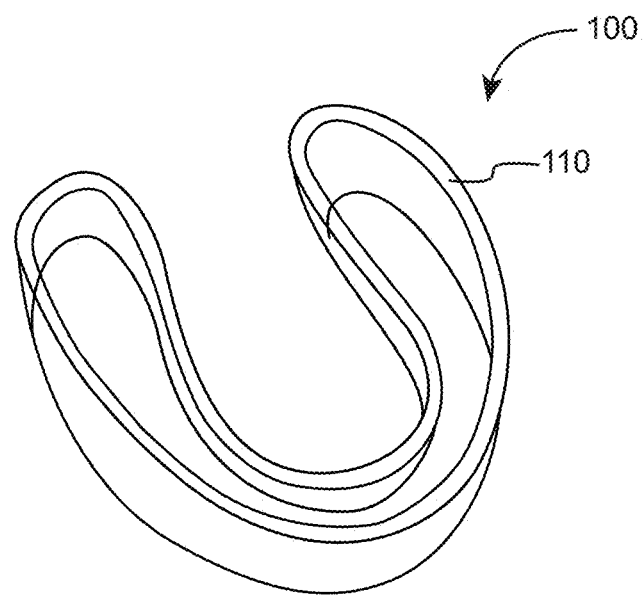
FIG. 2 illustrates a perspective view of a mouthpiece 100 in accordance with specific embodiments of the present invention.

FIG. 2 illustrates the mouthpiece 100 according to an embodiment of the invention. The mouthpiece 100 is preferably made up of flexible/soft material suitable for medical use. This allows easy insertion inside the mouth of the user providing comfort and reversible deformation. The mouthpiece 100 can be made up of flexible material impermeable to gases (such as air), liquids (water, cleaning liquid, disinfecting liquid) and any solid (waste particles, debris); such as latex, silicone or any other elastomeric material compatible with a medical or oral care use. The mouthpiece 100 is adapted to be placed on a dental arch of a user and comprises a flexible membrane 110 configured to deform in response to pressure variations inside the cavity resulting in volume changes of the cavity to perform cleaning/oral care action in the user's mouth. The cavity is a closed or nearly closed space formed between the flexible membrane 110 and the dental arch of the user when the mouthpiece 100 is placed on the dental arch of the user. The gripping pressure of the mouthpiece 100 placed on the dental arch of the user deforms the flexible membrane 110 of the mouthpiece 100.

Thermoplastic elastomers (TPE) are suitable as flexible materials for oral care applications. They are copolymers consisting in a physical mix of polymers having plastic and elastomeric properties. Furthermore, they have a suitable temperature range of operation, between −10° C. and 80° C. They can have good food and medical grade properties as well as an absence of significant creep. Furthermore, they have good tearing and tensile strength. This makes TPEs suitable for constituting the flexible material of the mouthpiece 100.

Silicone is another polymer suitable as flexible material for oral care applications. It is a very stable polymer with low chemical reactivity. Furthermore it is stable over a large range of temperature (between −100° C. and 250° C.). It also has excellent creep, tear strength and elongation properties. In addition, it also has good food and medical grade properties making it suitable for the flexible material of the mouthpiece 100.

For pleasing of the eyes, the inner and outer surface of the mouthpiece can be colored or transparent with visual effect or not, textured or not.

Figure 3:
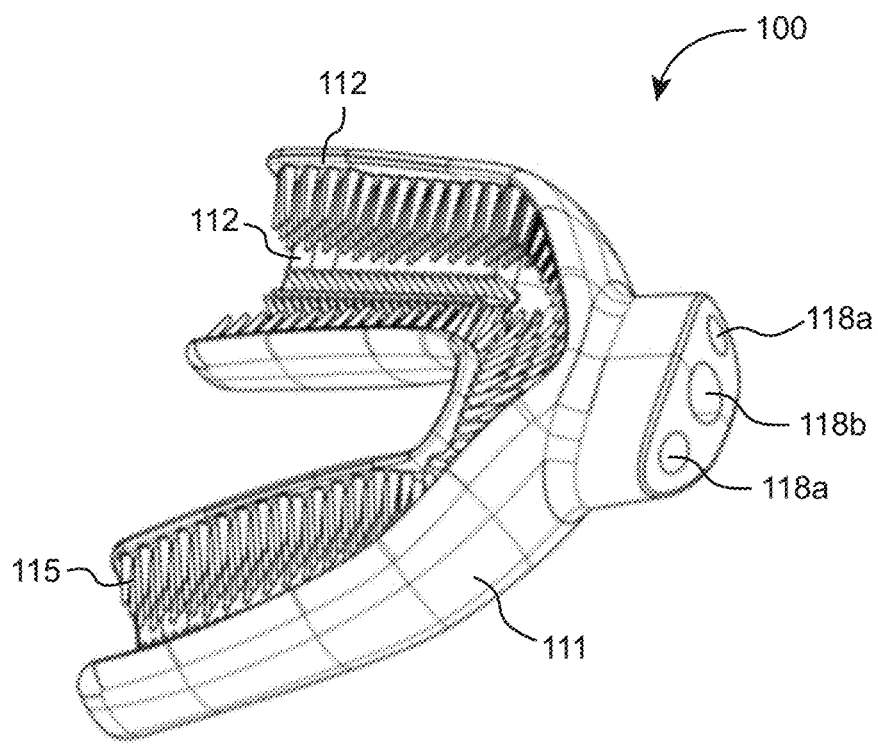
FIG. 3 illustrates a perspective view of the mouthpiece 100 in accordance with specific embodiments of the present invention.

According to a specific embodiment of the invention as shown in FIG. 3, the mouthpiece 100 comprises an outer membrane 111 and an inner membrane 112. The outer membrane 111 and the inner membrane 112 can be made up of similar or different materials compatible to be used in oral care. The mouthpiece 100 further comprises a plurality of holes 118a, 118b for injecting/draining of a fluid/cleaning agent/oral care solution into/from the mouthpiece 100. In particular examples, the at least one-hole 118a can be used for injecting the fluid inside the mouthpiece 100 and the at least one-hole 118b can be used for draining the fluid out of the mouthpiece 100. In some further particular examples, the plurality of holes 118 can be placed on any position in the mouthpiece 100. In a different example, a single hole 118 can be used for injecting/draining the fluid/cleaning agent/oral care solution. In another example of the invention, the injection hole 118a is placed in close proximity to the draining hole 118b. The purpose of doing so is to aspirate the exceeding amount of the fluid in the mouthpiece 100 so that the exceeding amount can be immediately drained out of the mouthpiece 100 through the draining hole 118b. According to a specific example, fluid/waste is drained out and ambient air is injected into the mouthpiece 100 to relax the mouthpiece 100. This process can be repeated multiple times in the at least one brushing cycle until all the waste is drained out or can be repeated fixed number of times. In another particular example, the mouthpiece 100 comprises numerous injection and aspiration ports on its inner membrane 112 to distribute both the aspiration and the injection of fluid evenly in the mouthpiece 100 and thus on the gums and dentition of the user.

According to a specific embodiment of the invention, a plurality of cleaning elements 115 are attached to the inner membrane 112. The cleaning elements 115 can include a set of cylindrical or conical bristles which may be glued, overmolded or attached to the inner membrane 112 by other different means. In specific examples, the shape of the cleaning elements 115 can be conical, cylindrical, flat, pointed tip, tapered, star-shaped, Zig-Zag etc. The cleaning elements 115 can be arranged in different angular arrangements in the mouthpiece 100 to provide effective cleaning around and in between the dental arch. The cleaning elements 115 can be used for removing plaque, debris, interdental particles etc. inside the mouth. The outer membrane 111 is configured to contact the gum of the user, providing comfort and good hermeticity to the cavity formed by the mouthpiece 100.

In some exemplary embodiments of the invention, the mouthpiece 100 can be in a form of a denture or a U-shaped mouthpiece. The mouthpiece 100 may be made-up of soft material which is molded/pre-shaped in a curved shape forming an arch, U-shape, c-shape, horseshoe shape, or any other shape allowing easy insertion of the mouthpiece 100 around the dental arch of the user. The components of the mouthpiece 100 can be composed of one or more several materials. Examples of materials may include but are not limited to, rubber, plastic, silicone, latex, polymer and other soft and flexible material suitable for oral care.

In yet another specific embodiment of the invention, the mouthpiece 100 is configured to provide the cleaning action with the mechanical force applied by the cleaning elements 115 on the teeth. The mechanical action of the cleaning elements 115 can be generated by pressure variations in the cavity. Moreover, the pressure variations in the cavity with respect to ambient pressure, result in the brushing cycle comprising at least one contraction phase and at least one relaxation phase of the mouthpiece 100. Further, the mechanical action of the cleaning elements/bristles 115 happens during the contraction/relaxation phase. The mechanical action of the cleaning elements 115 can consist of a combination of rubbing, sliding, deforming, rotating, vibrating or any other particular movement on the surface of the teeth of the user.

According to a specific embodiment of the invention, the mouthpiece 100 as illustrated in FIG. 2 and FIG. 3 is configured to form a cavity, which is a closed or nearly closed space formed between the mouthpiece 100 and the dental arch of the user. The flexible membrane 110 of the mouthpiece 100 as shown in FIG. 2 is configured to deform in response to pressure variations, that is by increasing/decreasing pressure with respect to ambient pressure in the cavity resulting in at least one contraction phase and at least one relaxation phase of the mouthpiece 100.

According to a specific embodiment of the invention, the cleaning action on the teeth of the user by the oral care appliance 10 may be carried out in at least one brushing cycle. The brushing cycle comprises at least one contraction phase and at least one relaxation phase of the mouthpiece 100. In a specific example, each of the contraction phase and the relaxation phase of the mouthpiece 100 are achieved due to pressure variations caused in the cavity. During the contraction phase, a negative pressure relative to ambient pressure in the cavity decreases the volume of the cavity. While during the relaxation phase, a positive pressure relative to ambient pressure in the cavity increases the volume of the cavity.

Figures 4A, 4B:
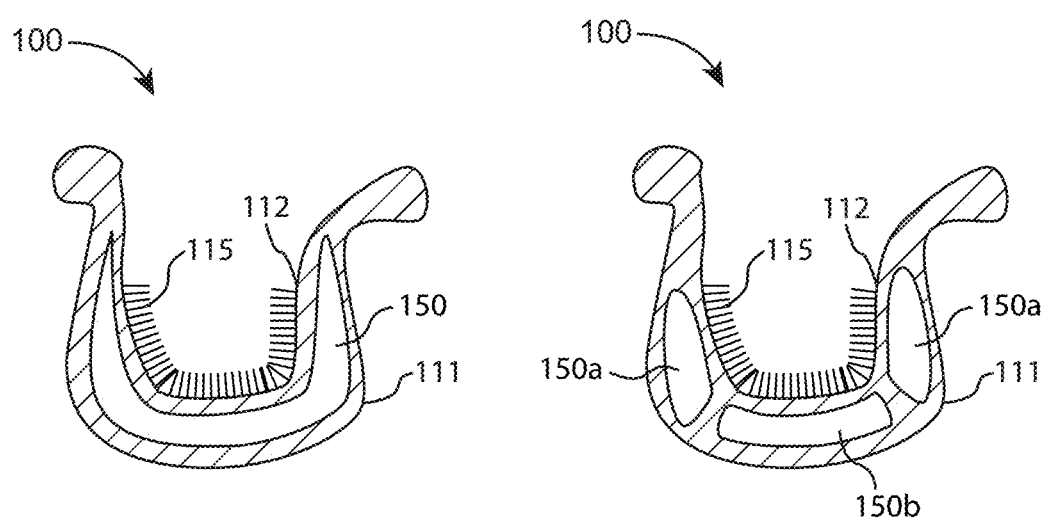
FIGS. 4A and 4B illustrate a section view of an inflatable mouthpiece 100 in accordance with specific embodiments of the present invention.

According to a specific embodiment of the invention as shown in FIG. 4A, the mouthpiece 100 can be an inflatable mouthpiece, wherein a cavity 150 is formed inside the mouthpiece 100 between the inner membrane 112 and the outer membrane 111. The pressure variation inside the cavity 150 with respect to ambient pressure, may result in at least one contraction phase and at least one relaxation phase of the mouthpiece 100. The inner membrane 112 can be made up of flexible material. In another embodiment, the outer membrane 111 can be made up of rigid or flexible material. The inner flexible membrane 112 can be configured to move with respect to changes in the pressure inside the cavity 150. In specific example, increase of pressure relative to ambient pressure inside the cavity 150 leads to the contraction phase of the mouthpiece 100 and pressure decrease relative to ambient pressure leads to the relaxation phase of the mouthpiece 100. The flexible membrane 110 may contain plurality of cleaning elements 115 for example bristles which helps in the cleaning action of the mouth during the contraction phase and the relaxation phase of the mouthpiece 100.

In an specific embodiment of the invention as shown in FIG. 4B, the mouthpiece 100 comprises a plurality of cavities 150a, 150b between the outer membrane 111 and the inner membrane 112. The membranes 111 and 112 can be made up of flexible or rigid materials. In a particular embodiment the outer membrane 111 is made of rigid material to drive the deformation of the inner membrane 112 toward the teeth. In another embodiment, the shape of the outer membrane 111 is designed to favor the amplitude and gripping pressure of the deformation of the inner membrane 112 toward particular areas of the dentition to improve their cleaning. This particular feature can be achieved by having discontinuity of the volume of the cavity or cavities, the thickness, the material, rigidity or the shape of the outer membrane 111 or any other of its characteristics.

According to a specific embodiment of the invention, the arrangement and configuration of the plurality of cleaning elements 115 can be customized for a specific user based on one or more focus areas corresponding to an identified dental problem area of the corresponding specific user. Examples of such arrangements and configurations include, but are not limited to, width, height, shape, stiffness, material and spacing of the cleaning elements 115.

According to a specific embodiment of the invention, each brushing cycle comprises a sequence of at least one contraction phase and at least one relaxation phase, wherein the sequence can be repeated one or more times as per the user's profile and requirements. In another specific example, each brushing cycle comprises a sequence of the at least one relaxation phase and at least one contraction phase. It is to be understood to the person skilled in the art that any sequence of the contraction phase and the relaxation phase is possible depending upon the requirements. The one or more contraction/relaxation phases can be comprised in a sequence.

Figure 5:
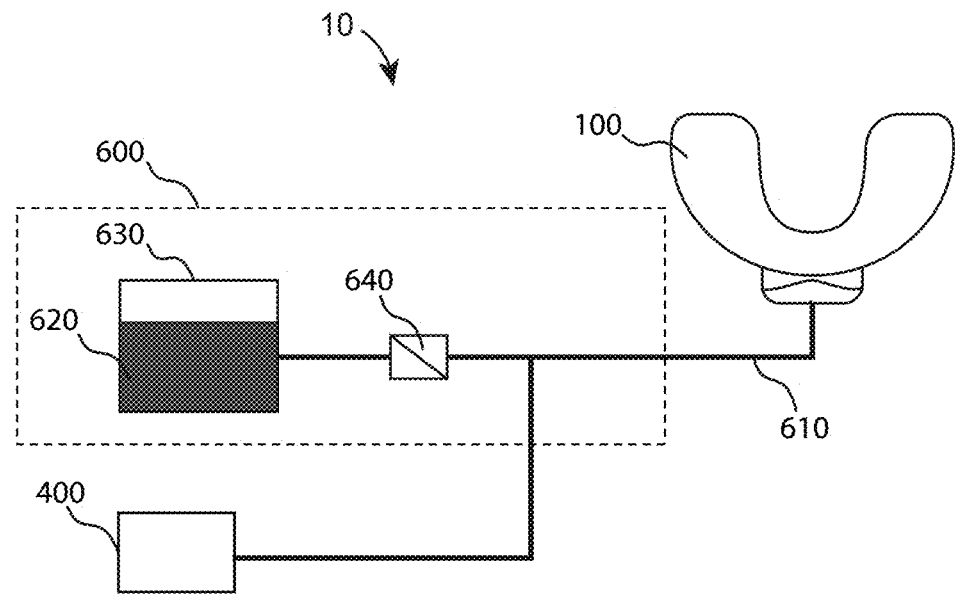
FIG. 5 illustrates a cleaning agent 620 supplied into the mouthpiece 100 during a brushing cycle to achieve the cleaning action in accordance with specific embodiments of the present invention.

In a specific embodiment of the invention as shown in FIG. 5, a cleaning agent 620 can be supplied into the mouthpiece 100 during a brushing cycle to achieve the cleaning action. The cleaning agent 620 can be supplied by an assembly 600, wherein the assembly 600 comprises a connection line 610 and at least one supply tank 630. Additionally, the assembly 600 can comprise a valve mechanism 640 configured between the supply tank 630 and the mouthpiece 100 in order to regulate the quantity/amount of cleaning agent 620 going into the mouthpiece 100. At least one propelling means 400 can also be operatively engaged to the assembly 600 or to the mouthpiece 100 directly to generate a flow of the cleaning agent 620 into the mouthpiece 100 by push or pull operation.

In yet another embodiment, the cleaning agent 620 can be directly injected to the mouthpiece 100 via a dispenser device or the cleaning agent 620 can be applied directly to the dental arch by the user to achieve the cleaning action.

According to a specific embodiment of the invention, the amount or volume of the cleaning agent 620 can be regulated by use of a monitoring means and/or software associated with the oral care appliance 10. The monitoring means may comprise at least one sensor which can be put at any suitable place to function in the oral care appliance 10.

In a specific embodiment of the invention, the brushing cycle may be operated in form of vibration patterns of the mouthpiece 100 to ensure proper cleaning of the teeth of the user. The brushing cycle may be adapted to operate at customizable vibration frequency ranges. In some examples, the vibration frequencies may include, but are not limited to, sonic frequency range or ultrasonic frequency range.

According to a specific embodiment of the invention, the cleaning agent 620 can be a liquid, solid, powder, emulsion, gels, fluid, or a combination thereof.

According to a specific embodiment of the invention, the cleaning agent 620 can be aspirated into the mouthpiece 100 by creating a pressure difference between the mouthpiece 100 and the at least one supply tank 630.

According to a specific embodiment, the cleaning agent referred to herein could be: a polishing agent such as an inert abrasive; a cleaning agent such as fluoride, activated charcoal, or a fluoride-free antibacterial composition; a halitosis treatment agent such as chlorine dioxide; or a whitening agent such as hydrogen peroxide. The cleaning agent could also be any mixture of these kinds of agents and chemicals.

In the case of a cleaning agent in the form of a powder, it can be mixed with a diluting liquid thanks to a dedicated mixing system such as a venturi assembly, a mixing chamber or any other mixing mean. The mixed solution is then injected as an homogenous fluid with a pressure difference between the mouthpiece 100 and the supply tank(s) 630.

In the case of a cleaning agent in the form of a gel, the cleaning agent might also be injected thanks to a pressure difference between the mouthpiece 100 and the supply tank 630. However, if the viscosity of the gel is too high this solution would take too much time. If so, the solution could be integrated inside a handle close to the mouthpiece 100 to reduce the injection duration, diluted in a diluting solution and then injected as a liquid solution or injected with a higher pressure thanks to a worm screw, a piston, a peristaltic pump or any other dedicated distributor.

According to a specific embodiment of the invention, the pressure variation inside the cavity (relative to ambient pressure) results in receiving the cleaning agent 620 from the at least one supply tank 630 to the mouthpiece 100. In an example, one way to create the pressure difference between the cavity and the at least one supply tank 630 is to apply a positive pressure in at least one supply tank 630 to push the cleaning agent 620 into the mouthpiece 100. Another way to create the pressure difference between the cavity and supply tank 630 is to create a negative pressure in the cavity relative to the pressure in the supply tank 630, thereby pulling/aspirating the cleaning agent 620 into the connection line 610 and later on, the cleaning agent 620 can be injected into the mouthpiece 100 with the help of a propelling means 400. Therefore, the contraction phase of the mouthpiece 100 can result in the aspiration of the cleaning agent 620 into the mouthpiece 100.

According to a specific embodiment of the invention, the contraction phase of the mouthpiece 100 can result in extraction of the cleaning agent 620 from the mouthpiece 100.

In a specific embodiment of the invention, the means for varying pressure 200 can be selected from a pump, a depression chamber, a valve mechanism or a combination thereof. The valve mechanism can comprise one or more solenoid valves, servo-valves, pneumatic control valves, electronic valves with pinch valves, membrane valves, or a combination thereof. The means for varying pressure 200 increases/decreases the pressure with respect to ambient pressure inside the cavity resulting in at least one of the relaxation phase and the contraction phase of the mouthpiece 100. The pressure decrease relative to ambient pressure in the cavity may result in contraction phase of the mouthpiece 100 and vice-versa.

In a specific embodiment of the invention, where the mouthpiece 100 is inflatable as shown in FIG. 4, the pressure decreases (relative to ambient pressure) inside the cavity 150 of the mouthpiece 100 may result in the relaxation phase of the mouthpiece 100, and pressure increases inside the cavity 150 of the mouthpiece 100 may result in the contraction phase of the mouthpiece 100.

In a specific embodiment of the invention, a pump 410 can act as means for varying pressure 200 inside the cavity. The pump can be a one-way pump (e.g., a hermetic pump that does not let fluid or air pass when turned off), a two-way pump, a vacuum pump, a tailor-made pump, a hermetic pump generally, or a peristaltic pump. The pump transforms electrical energy in mechanical work used to move fluid.

Figure 6:
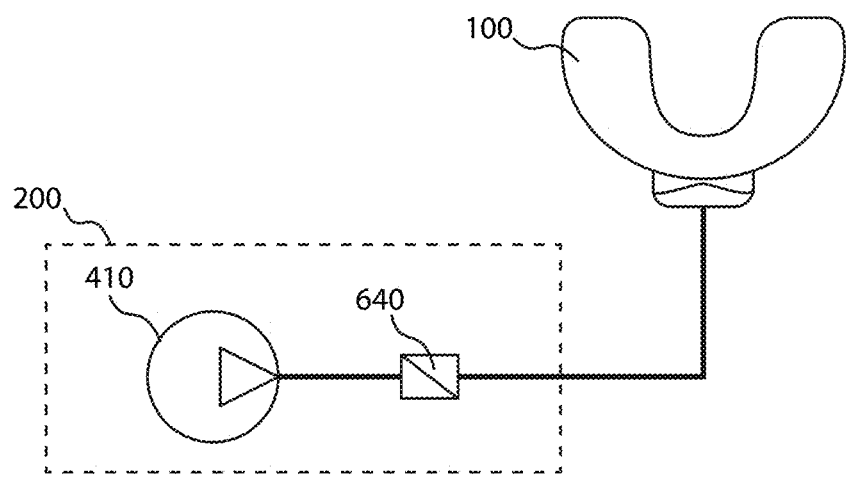
FIG. 6 illustrates the pressure varying means 200 in accordance with specific embodiments of the present invention.

In a specific embodiment of the invention as shown in FIG. 6, a pump 410 can be combined with a valve mechanism 640 to act as means for varying pressure 200. The valve mechanism 640 is configured between the mouthpiece 100 and the pump 410.

Figure 7:
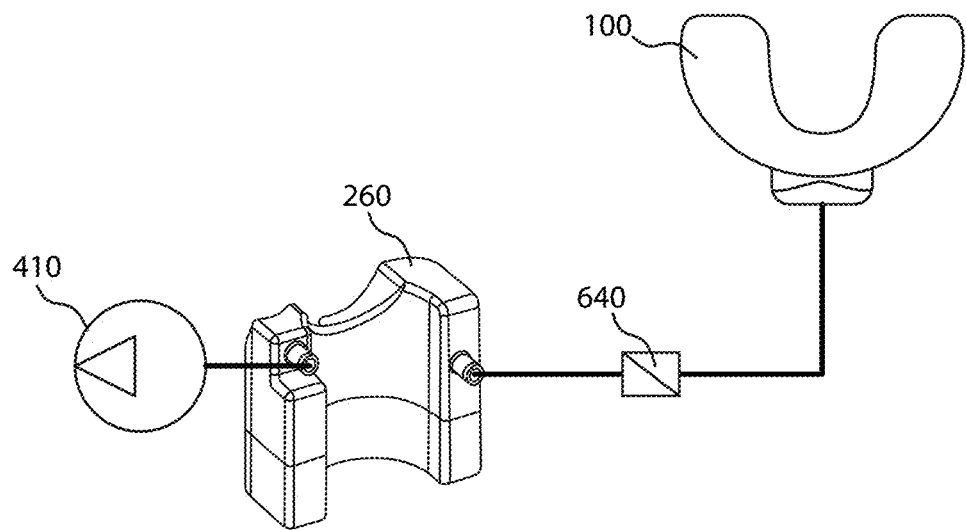
FIG. 7 illustrates the pressure varying means 200 in accordance with specific embodiments of the present invention.

In a specific embodiment of the invention as shown in FIG. 7, a depression chamber 260 along with a pump 410 can act as means for varying pressure 200. The depressions can be created in the chamber 260 using the pump 410 and can subsequently be used to create pressure difference inside the cavity. The valve mechanism 640 can also be configured between the depression chamber 260 and the mouthpiece 100. In a specific embodiment of the invention, the valve mechanism 640 comprises an electrically or mechanically operated valve.

According to a specific embodiment of the invention, means for varying pressure 200 can be two different units, in other words means for increasing pressure may differ from the means for decreasing pressure inside the cavity.

In a specific embodiment of the invention, means for varying pressure 200 is a two-way pump, wherein it acts as a vacuum pump to decrease the pressure and in another situation the pump acts as an air pump to increase the pressure.

In a specific embodiment of the invention, the oral care appliance 10 further comprises actuator 300 to control the at least one contraction phase and the at least one relaxation phase of the mouthpiece 100 by regulating the pressure inside the cavity. The actuator 300 can be an electronic system with components that are selected from at least a sensor, a timer or combination thereof.

In one specific embodiment of the invention, the sensor can be a pressure sensor, volume sensor, flow rate sensor or the like known to a person skilled in the art. In specific examples, the volume sensor is configured to measure the volume of fluid entering the mouthpiece 100 or through the mouthpiece 100 into the mouth or the cavity. This volume sensor can be a scale, a float ball, a displacer, a differential pressure sensor, a microwave sensor, a conductivity probe, an optical sensor or any other mean designed to measure the volume of the fluid entering the mouthpiece 100 known to a person skilled in the art. The pressure sensor is configured to measure the pressure inside the cavity, for example, pressure during the contraction/relaxation of the mouthpiece 100 or the pressure difference between the components of the oral care appliance 10. This pressure sensor can be an absolute or differential pressure gauge, a diaphragm gauge, a force balance sensor, a strain gauge or any other mean designed to measure the pressure of the fluid entering the mouthpiece 100 known to a person skilled in the art. The flow rate sensor is configured to measure the flow rate of fluid into the mouthpiece 100 or the cavity. This flow sensor can be a Pitot tube, a differential pressure-based flow meter, a volumetric based flow meter, turbine based flow meter, a velocity measurement based flow meter or any other mean designed to measure the flowrate of the fluid entering the mouthpiece 100 known to a person skilled in the art.

In one specific embodiment of the invention, the sensor can comprise, but is not limited to, electrochemical sensor, piezoelectric sensor, thermometric sensor, optical sensor, or a combination thereof.

According to a specific embodiment of the invention, the actuator 300 is configured to monitor the at least one operational characteristic, wherein the operational characteristic can be selected from a plurality of operational characteristics comprising pressure, volume, flow rate, time, user input and blood presence and concentration or any other relevant biomarker. The actuator 300 is triggered when at least one operational characteristic reaches a targeted threshold value.

According to a specific embodiment of the invention, the actuator 300 additionally controls the injection system to inject any of a cleaning agent, a liquid, a solid or a gas or a combination thereof into the mouth of the user. During the brushing cycle, the injection of a cleaning agent 620 into the mouth is controlled by the actuator 300 in response to the contraction/relaxation phase of the mouthpiece 100.

In one specific embodiment of the invention, actuator 300 is placed in close proximity to the mouthpiece 100 and monitors the pressure inside the cavity. The pressure sensor itself can be integrated inside the connections operatively engaged to the cavity, a handle, the mouthpiece 100 or other element linked to the cavity. When the pressure inside the cavity reaches a targeted threshold value, the actuator 300 enables the opening of a valve mechanism 640 to let the cleaning agent 620 flow into the mouthpiece 100.

The operational characteristics according to the invention, are the parameters which are selected to control the operation of the oral care appliance 10 or the brushing cycle. The operational characteristics can be selected from pressure inside the cavity, pressure difference between the components of the oral care appliance 10, pressure measured during the contraction/relaxation of the mouthpiece 100, volume of fluid (air or liquid) inside the cavity, flow rate of the fluid coming in and out of the mouthpiece 100 or the cavity, pre-set time or combination of one or more known to a person skilled in the art, which makes the oral care appliance 10 work efficiently. In specific examples of the invention, negative and positive pressure relative to ambient pressure inside the cavity create the contraction phase and the relaxation phase of the mouthpiece 100. Similarly, volume increase and decrease of the fluid inside the cavity, in-flow rate and out-flow rate and other operational characteristics are responsible for the contraction phase and the relaxation phase of the mouthpiece 100. In one example, the operational characteristics can be defined by the user himself. The user can fix parameters to control the action of brushing which may include, but is not limited to, alter the type of the cleaning agent, the type of cleaning element, duration for cleaning action, count or pressure of contraction/relaxation phases, or other operational characteristics which can include volume of cleaning agent 620 to be used, pressure in the mouthpiece 100 or the like. Based on these user inputs, the actuator 300 regulates at least one of the contraction phase and the relaxation phase of the mouthpiece 100. Additionally, the operational characteristics can be provided by the user during the brushing cycle. These type of user input can comprise, but are not limited to, push of a button during the cycle, voice input, pressure input via the pressure sensor in the occurrence of blowing/aspiration by the user, gestures detected by sensors such as an accelerometer, a gyroscope, a magnetometer, or any type of gesture detection sensors, bleeding detected by sensors such as blood sensor, optical sensor or the like or any other action on a remote interface such as a smartphone. Furthermore, the operational characteristics can be used to detect abnormal operating such as clogged connection via pressure inputs, leaking connection, insufficient sealing with user's mouth.

In specific embodiments of the invention, the oral care appliance 10 is configured to operate the brushing cycle(s) according to the one or more operational characteristics mentioned above (e.g., duration, count, pressure, amount) defined by the user, an operator, a healthcare professional, one or more default cycles, or a combination thereof.

In one specific embodiment of the invention, the actuator 300 is an electronic system which comprises a microprocessor 310 and a sensor or timer. The sensor or the timer monitors the operational characteristics and provides live measurements to the microprocessor 310. The microprocessor 310 uses the inputs from the sensor or the timer and sends a command signal to the means for varying pressure 200 when an operational characteristic reaches a targeted threshold value. Finally, the means for varying pressure 200 can result in increase/decrease of the pressure in the cavity depending on the signal by the microprocessor 310. Therefore, the microprocessor 310 triggers the means for varying pressure 200 when at least one operational characteristic reaches a targeted threshold value and subsequently, controls the contraction phase and the relaxation phase of the mouthpiece 100. In some embodiments, the microprocessor 310 is configured to communicate with the sensor or the timer via various types of wireless technologies, such as, but not limited to, RFID, Bluetooth, Bluetooth Low Energy, Wifi connections, Zigbee, Z-Wave, and other such technologies.

According to a specific embodiment of the invention, any other processor-based device such as an application specific processor or a microcontroller can also be used in place of microprocessor 310 to perform the similar function(s).

Figure 8:
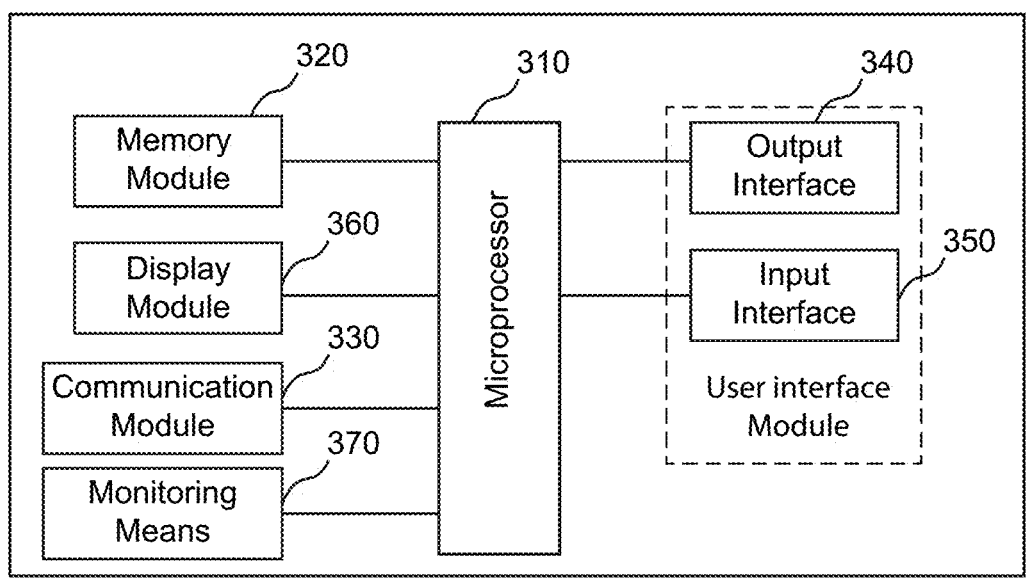
FIG. 8 illustrates an actuator 300 in accordance with specific embodiments of the present invention.

According to a specific embodiment of the invention as shown in FIG. 8, the actuator further comprises a memory module 320 in communication with microprocessor 310 to store the information. The memory module 320 may be configured to store a variety of information, including any user information, dental history of the user, information related to the brushing profile of the user or any other useful information. The memory module 320 is configured to store and manage a plurality of the operational characteristics according to which the at least one brushing cycle is operated. For example, the memory module 320 stores the preset threshold value for respective operational characteristics, so that it can be compared with the sensor monitored values from the sensor(s) or the timer to further carry out the operation. The memory module 320 may also contain a set of instructions that affect operation of the microprocessor 310. The memory module 320 may be erasable/writable non-volatile memory, such as flash memory, dynamic volatile memory, or other suitable memory including replaceable memory media, or combinations thereof. The microprocessor 310 further can be coupled to a display module 360, an input interface 350 and an output interface 340. The input interface 350 and the output interface 340 collectively form a user interface module. The actuator 300 may further comprise a communication module 330 to enable communication with external networks, a user's smartphone, components of the oral care appliance 10, an online source, a health care service provider, etc. The actuator 300 may also include the monitoring means 370 as disclosed in the above-mentioned embodiment(s). The monitoring means 370 may further comprise sensor(s) configured to monitor values of one or more of the operational characteristics. According to a specific example, the monitoring means 370 may include an accelerometer, gyroscope, magnetometer, camera, or any combination thereof. In addition, the actuator 300 may further comprise a timer, a counter, a clock, and a user identification module.

In a specific embodiment of the invention, the communication module 330 is configured to communicate with other external communication entities such as a smartphone, or a detached display. Accordingly, the communication module 330 includes one or more wireless antennas configured to utilize one or more communication protocols (e.g., WiFi, Bluetooth, wireless USB etc.). Optionally, the communication module 330 may include one or more communication ports (e.g., USB ports).

According to a specific embodiment of the invention, the communication module 330 is specifically arranged to communicate in accordance with the Near Field Communication (NFC) standard which is designed to provide very short-range communication.

According to a specific embodiment of the invention, various combinations of the sensors or the timer are possible in the actuator 300 depending on the requirements as per the different embodiments of the invention. For example, the actuator 300 can be configured to work based on the pressure sensor alone or with combination of any other sensor or the timer.

In a specific embodiment of the invention, the oral care appliance 10 may be pre-programmed to automatically perform the at least one brushing cycle in a predefined sequence in accordance with the at least one default cycle based on one or more control modes, wherein the control modes comprise a time-controlled mode, a volume-controlled mode, a pressure-controlled mode, a frequency-controlled mode, a user-specific mode, a biomarker detection mode or a combination thereof.

In a specific embodiment, the actuator 300 generates a command for the operational characteristic. This command can take a lot of signal forms such as linear, sinusoidal, ramps, square signal, see-saw signal, exponential or any other signal form known to the person skilled in the art.

In a specific embodiment, the command can also vary from a user to another to adapt to the preferences or the preset values chosen.

In a specific embodiment, the command may also vary on a specific period of time. For example, as the user begin to be used to the oral care appliance, the command can evolve to become more complex.

In another specific embodiment of the invention, a volume-controlled mode is used, wherein the operational characteristic selected to be monitored is a volume of fluid (air or liquid) injected into the cavity or the volume of fluid extracted from the cavity. The volume is monitored by the volume sensor, which is a component of actuator 300. The actuator 300 triggers the means for varying pressure 200 when the targeted threshold value of the volume is sensed, thereby controlling the contraction phase and the relaxation phase of the mouthpiece 100. In a specific example, in which the means for varying pressure 200 comprises the valve mechanism 640 and the pump 410, the actuator 300 triggers the opening and closing of the valve mechanism 640 and the operation of the pump 410 to regulate the volume of fluid in the cavity. During the contraction phase, the valve mechanism 640 is in open position and the pump aspirates air or liquid from the cavity of the mouthpiece 100. The mouthpiece thus contracts itself and the bristles 115 contact the teeth and the gums. The volume sensor, which is a component of the actuator 300, monitors the volume of fluid aspirated from the cavity. As soon as the target threshold value of volume aspirated is reached, the actuator 300 triggers the pump 410 and the valve mechanism 640 so that air is injected in the cavity of the mouthpiece 100 and the brushing cycle goes into the relaxation phase. In a specific example, there is a succession of contraction and relaxation phases. Thus, during the relaxation phase, the volume sensor of the actuator monitors the volume of fluid injected in the cavity of the mouthpiece 100. As soon as the targeted threshold value of volume of fluid injected in the mouthpiece is reached, the actuator 300 triggers the pump 410 and the valve mechanism 640 so that the brushing cycle goes into the next (contraction) phase. In another specific example, a preset volume of the cleaning agent 620 can be injected into the mouthpiece 100 or fluid/waste extracted from the mouthpiece 100. The value of the volume to be injected or aspirated can also be variable during the brushing cycle. This allows both fast and ample contraction and relaxation of the mouthpiece 100. This process tends to improve the overall efficacy of the brushing cycle. The volume command can have multiple forms such as linear, sinusoidal, ramps, successive plates, see-saw signal, exponential or any other signal form known to the person skilled in the art.

In another specific embodiment of the invention, a pressure-controlled mode is used. In this mode, a pressure sensor of the actuator 300 is configured to monitor the pressure inside the cavity. The actuator 300 triggers the means for varying pressure 200 when the targeted threshold value of the pressure is reached. In another specific example, a preset pressure value is used to control pressure in the cavity. During the contraction phase, the valve mechanism 640 is in open position and the pump aspirates air or liquid from the cavity of the mouthpiece 100. The mouthpiece thus contracts itself and the bristles 115 contact the teeth and the gums. The pressure sensor, which is a component of the actuator 300 monitors the pressure inside the cavity. As soon as the target threshold value of pressure is reached, the actuator 300 triggers the pump 410 and the valve mechanism 640 so that air is injected in the cavity of the mouthpiece 100 and the brushing cycle goes into the relaxation phase. In a specific example, there is a succession of contraction and relaxation phases. During the relaxation phase, the pressure sensor of the actuator monitors the volume of fluid injected in the cavity of the mouthpiece 100. As soon as the targeted threshold value of volume of fluid injected in the mouthpiece is reached, the actuator 300 triggers the pump 410 and the valve mechanism 640 so that the brushing cycle goes into the next (contraction) phase. The value of the command of the pressure during the contraction, relaxation and injection phase can also be variable during the brushing cycle. This allows both fast and ample contraction and relaxation of the mouthpiece 100. This process tends to improve overall efficacy of the brushing cycle. The pressure command can have multiple forms such as linear, sinusoidal, ramps, successive plates, see-saw signal, exponential or any other signal form known to the person skilled in the art.

In yet another specific embodiment of the invention, a time-controlled mode for the oral care appliance 10 is used, wherein a pre-set time is monitored by the timer of the actuator 300 to control the at least one contraction phase and at least one relaxation phase of the mouthpiece 100. In specific examples, the pre-set time can be a time of opening/closing of the valve mechanism 640 of the means for varying pressure 200, running time of the pump 410 of the means for varying pressure 200, or any another pre-set time for the working of the oral care appliance 10 according to different embodiments of the invention. The value of the duration separating two phases can also be variable during the brushing cycle. This allows both fast and ample contraction and relaxation of the mouthpiece 100. This process tends to improve the overall efficacy of the brushing cycle. The duration of aperture of the valves command can have multiple forms such as linear, sinusoidal, ramps, successive plates, see-saw signal, exponential or any other signal form known to the person skilled in the art.

In yet another specific embodiment of the invention, the mode for the oral care appliance 10 is a smart depression mode, wherein both a pressure sensor and the timer are used. The actuator 300 will trigger the means for varying pressure 200 when the targeted threshold value of pressure or time is reached, whichever occur first. In other words, if pressure inside the cavity reaches a targeted threshold value prior to the targeted threshold value of time or vice versa, the actuator 300 will trigger the means for varying pressure 200 to control the relaxation phase and the contraction phase of the mouthpiece 100. This mode will prevent the user from waiting for an indefinite time if the pressure inside the cavity takes longer than expected to reach the target threshold value. The delay in attainment of the pressure in the cavity can be a reason due to leaks, wrong placement of the cleaning element, or operating issues. At the same time the mode results in the oral care appliance not needing to wait longer than necessary if the desired pressure has been reached. Furthermore, both the pressure and the time commands can vary during the cycle.

In yet another specific embodiment of the invention, a biomarker detection mode for the oral care appliance 10 is used, wherein a pre-set amount of biomarker is monitored by bio-sensors of the actuator 300 to control the at least one contraction phase and at least one relaxation phase of the mouthpiece 100. In a specific example, if the blood level in the saliva is too high the aperture of the valve mechanism 640 is modified to favor a low gripping of the contraction phase on the gum of the user in order to prevent painful feeling. In another example, if the glucose level measured in the saliva of the user reaches a specific threshold the switching time of the valve mechanism would evolve to favor a deep cleaning of the oral environment of the user. Furthermore, for both examples, the total amount of contraction and relaxation phases can vary to increase or decrease the overall length of the brushing cycle and thus its efficacy.

In another specific embodiment of the invention, the control mode for the oral care appliance 10 is a frequency-controlled mode in which the actuator 300 triggers the means for varying pressure so that a preset number of brushing cycles or contraction/relaxation phases over a particular period of time are completed. The frequency command can vary during the brushing cycle to accelerate or decelerate the contraction and relaxation phase. The two phases command can evolve separately meaning that the duty cycle of the command might vary too.

In another specific example, the control mode for the oral care appliance 10 is a user-specific mode which is based on pre-recorded default cycles, such as, but not limited to, sensitive cycle, deep cycle, classic cycle, day cycle, night cycle, long cycle, short cycle, child cycle, elder cycle, softer cycle, or the like.

In yet another specific embodiment of the invention, the actuator 300 triggers the means for varying pressure 200, when one targeted threshold of at least two operational characteristics is reached, whichever occurs first. Table 1 shows possible combinations of operational characteristics selected for a control mode to work in an oral care appliance 10. The other operational characteristics can be selected from, but are not limited to, alterations to the type of the cleaning agent, the type of cleaning element, duration for cleaning action, count or pressure of contraction/relaxation phases, or other operational characteristics which can include volume of cleaning agent 620 to be used, pressure in the mouthpiece 100, push of a button during the cycle, voice input, gestures detected by sensors such as an accelerometer, a gyroscope, a magnetometer, or any type of gesture detection sensors, and bleeding detected by sensors such as blood sensor, color sensor or the like.

| Mode | Volume threshold (V) | Pressure threshold (P) | Time threshold (T) | Other operational characteristics (O) |
|---|---|---|---|---|
| 1. Volume controlled | On | Off | Off | Off |
| 2. V/P controlled | On | On | Off | Off |
| 3. V/P/T controlled | On | On | On | Off |
| 4. V/P/T/O controlled | On | On | On | On |
| 5. Pressure controlled | Off | On | Off | Off |
| 6. Smart Depression | Off | On | On | Off |
| 7. P/T/O controlled | Off | On | On | On |
| 8. Time controlled | Off | Off | On | Off |
| 9. T/O controlled | Off | Off | On | On |
| 10. Other parameter controlled | Off | Off | Off | On |
| 11. V/T controlled | On | Off | On | Off |
| 12. V/O controlled | On | Off | Off | On |
| 13. P/O controlled | Off | On | Off | On |
| 14. V/T/O controlled | On | Off | On | On |
| 15. V/P/O controlled | On | On | Off | On |

According to a specific embodiment of the invention, the brushing cycle for cleaning action of the dental arch is done without any injection of the cleaning agent 620 but with an air injection. The contraction phase and relaxation phase of the mouthpiece 100 along with air exposes the interstitial region of the teeth to a fast circulation of the air, thus disrupting and removing the dental plaque and other debris from the dental arch.

In a specific embodiment of the invention, the data for the brushing cycle can be pre-set in the actuator 300. In specific examples, the actuator 300 can be configured to receive a prescription from a health care professional in real-time, thereby resulting in adaptation of the at least one brushing cycle for the user by modifying one or more operational characteristics. The prescription may be based on dental characteristics and/or preferences of the user, for example, but not limited to, the contours or shape of the dental arch of the user, the user's diet, the oral microbiology of the user, the user's medical/dental record, etc.

In a specific embodiment of the invention, the actuator 300 is configured to control the at least one of contraction and relaxation phase of the mouthpiece according to a personalized program set to reach the definite goals. The personalized program set by or for the user may include, but is not limited to, whiter teeth in one month, curing periodontics over a short duration, preparing the user for a surgical operation happening in two months or the like. Moreover, the goals or personalized programs may be adjusted over time as appropriate for the user, given the prevailing circumstances.

According to a specific embodiment of the invention, the present invention provides a method of controlling pressure in an oral care appliance 10, the method comprising the steps of: varying pressure (relative to ambient pressure) inside a cavity to deform the mouthpiece 100 during the brushing cycle, wherein the cavity is formed by at least a portion of the mouthpiece 100, wherein the brushing cycle comprises at least one contraction phase and at least one relaxation phase of the mouthpiece 100; and regulating the pressure inside the cavity to control the at least one of contraction phase and the relaxation phase, wherein the actuator 300 is triggered to regulate the pressure inside the cavity when at least one operational characteristic reaches a targeted threshold value.

Figure 9:
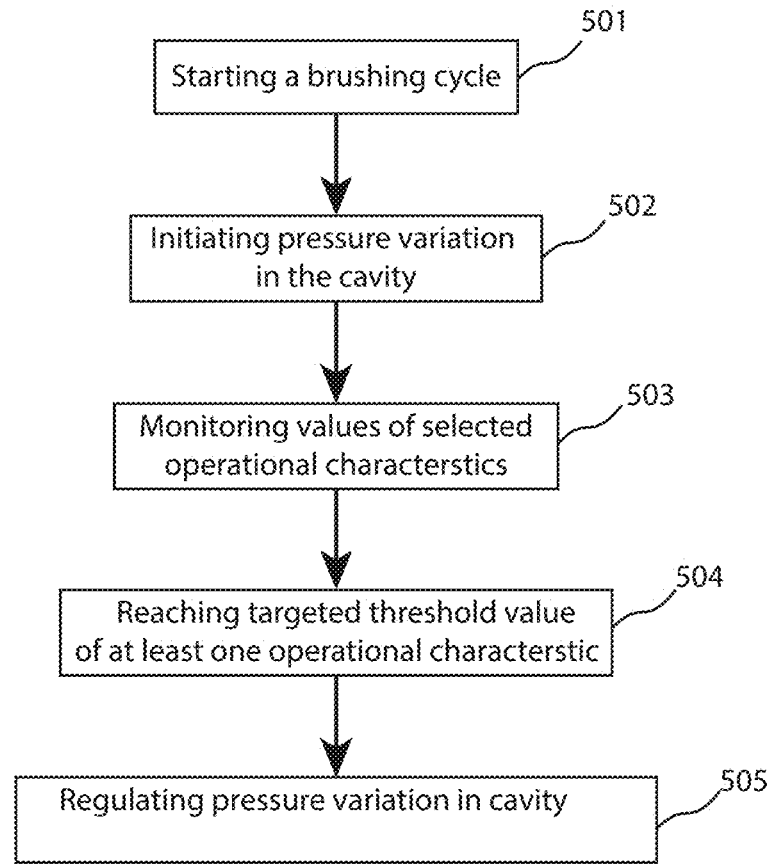
FIG. 9 schematically shows an example flow diagram of a method 500 of controlling the pressure in the oral care appliance 10 in accordance with specific embodiments of the present invention.

FIG. 9 schematically shows an example flow diagram of a method 500 that is performed to control the pressure variation in the mouthpiece 100 of the oral care appliance 10. Method 500 comprises steps 501-505 in turn to control the pressure variation in the mouthpiece 100. Multiple steps 501-505 are arranged in accordance with at least some embodiments described herein. The method commences with a step 501 of starting a brushing cycle. The method continues with a step 502 of initiating pressure variation in the cavity. Step 502 can be conducted by the pressure variation means described herein, or via some other mechanism or action. The method continues with a step 503 of monitoring values of selected operational characteristics. The method continues with a step 504 of reaching a targeted threshold value of at least one operational characteristic. Step 503 can be conducted by the actuator described herein. Step 504 can be conducted by the oral care appliance in the ordinary course of its operation as it proceeds through the brushing cycle. The method concludes with a step 505 of regulating a pressure variation in the cavity. The step can be conducted by the pressure variation means as triggered by the actuator. The actuator can be configured to detect the occurrence of step 504. The actuator can be configured to, in response to detecting the occurrence of step 504, trigger and control the execution of step 505 by the pressure variation means.

In a specific embodiment of the invention, the pressure inside the cavity is varied by the means for varying pressure 200, thereby regulating at least one of the contraction phase and the relaxation phase of the mouthpiece 100. The means for varying pressure 200 is responsible for the pressure increase and decrease inside the cavity (relative to ambient pressure). The means for varying pressure 200 can include a valve mechanism, a pump, a vacuum unit or a combination thereof.

According to a specific embodiment of the invention, the valve mechanism can include proportional valves, where the pressure variation inside the cavity depends on the aperture ratio of the valves. In specific embodiments of the invention, the valve mechanism can be replaced with a direct pump, which can be a vacuum pump or an air pump or any other structure that provides pressure variation known to the person skilled in the art. In the embodiments disclosed herein that utilize pumps, the pumps can be controlled to a finer level of detail than binary open/closed or on/off states. For greater efficiency and comfort in dental cleaning of the mouthpiece 100, the pumps can be turned on at an evolutive set power.

According to a specific embodiment of the invention, the positive pressure (relative to ambient pressure) generated in the mouthpiece 100 can be a result of injecting the liquid and/or air into the cavity.

Figure 10:
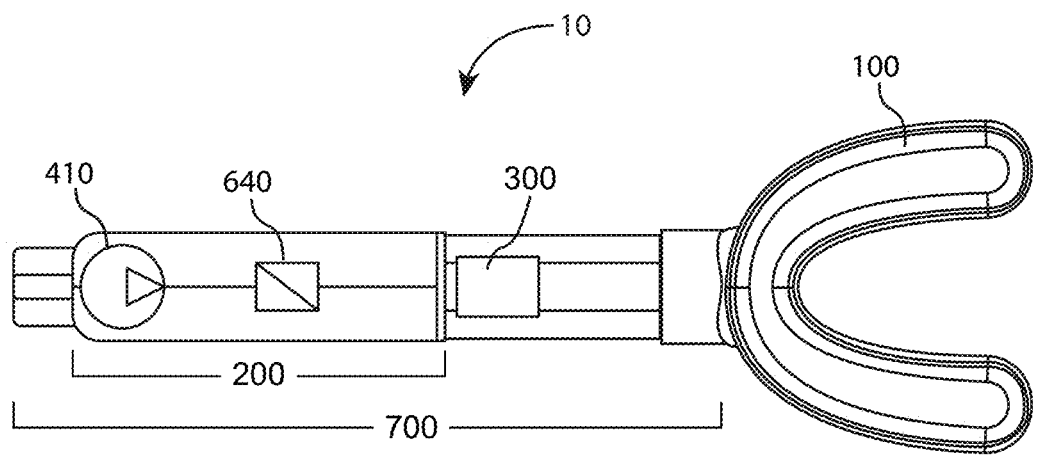
FIG. 10 illustrates a portable oral care appliance 10 in accordance with specific embodiments of the present invention.

According to a specific embodiment of the invention, the oral care appliance 10 is a portable appliance or the components of the oral care appliance 10 can be integrated to a single unit. As shown in FIG. 10, the mouthpiece 100 is attached to a handle 700, the handle 700 comprising the actuator 300 and the means for pressure variation 200. The actuator 300 monitors the operational characteristics in the link to the mouthpiece 100, and further triggers the means for pressure variation 200 to change the pressure inside the mouthpiece 100. The change in the pressure in the mouthpiece 100 can result in at least one contraction phase and at least one relaxation phase during the brushing cycle. The means for pressure variation 200 can further comprise at least a valve mechanism 640, a pump 410, a vacuuming unit or a combination thereof. The portable oral care appliance 10 is a compact appliance consisting of all the above-mentioned elements in the attached handle 700.

One or more of the above-mentioned embodiments/steps of the present invention can be automated completely or partially using one or more of a control system or by a software.

According to a specific embodiment of the invention, the oral care appliance 10 according to the invention provides short contractions of the mouthpiece 100, thus disrupting the dental plaque. The different control modes of the oral care appliance 10 enable it to regulate the count and duration of the contractions and relaxations of the mouthpiece 100, thus providing for better oral hygiene.

According to an embodiment of the invention, the pressure-controlled mode can be efficient as the pressure inside the cavity is always controlled. Nevertheless, in the case of a misplacement of the mouthpiece 100, or if there is a leak inside the cavity, this mode can lead to very long cycle time as the appliance 10 will wait for the pressure inside the cavity to reach the targeted threshold. Further, the time-controlled mode can be painful as the pressure in the cavity can reach a level leading to strong contractions of the mouthpiece 100 thus provoking pain to the user. The smart depression mode of the oral care appliance 10 will prevent the user from waiting for an indefinite time if the depression in the cavity takes time to reach the targeted threshold. Furthermore, security and comfort control is provided by preventing the pressure from rising above a targeted threshold.

Although the invention has been described with regard to its embodiments, specific embodiments and various examples, it should be understood that various changes and modifications as would be obvious to one having the ordinary skill in this art may be made without departing from the scope of the invention as set forth in the claims appended hereto.

What is claimed is:

1. An oral care appliance comprising:
   a mouthpiece configured to deform in response to pressure variations inside a cavity during a brushing cycle, wherein the cavity is formed between the mouthpiece and a dental arch, and wherein the brushing cycle comprises at least one contraction phase and at least one relaxation phase of the mouthpiece;
   an actuator configured to control at least one of the contraction phase and the relaxation phase by controlling or varying the pressure inside the cavity, wherein the actuator is triggered when one of at least two operational characteristics reaches a targeted threshold, whichever occurs first; and
   wherein the at least two operational characteristics include a pressure and a time.

2. The oral care appliance according to claim 1, wherein the mouthpiece comprises a flexible membrane configured to deform in response to the pressure variations in the cavity.

3. The oral care appliance according to claim 2, wherein the cavity is formed between the flexible membrane and the dental arch.

4. The oral care appliance according to claim 1, wherein the at least one contraction phase and the at least one relaxation phase of the mouthpiece are achieved by one of increasing the pressure inside the cavity and decreasing the pressure inside the cavity.

5. The oral care appliance according to claim 1, wherein the brushing cycle is repeated one or more times.

6. The oral care appliance according to claim 1, wherein the actuator regulates the pressure in the cavity via one of: a pump, a depression chamber, and a valve mechanism.

7. The oral care appliance according to claim 1, wherein the actuator is an electronic system and comprises at least one of a sensor and a timer.

8. The oral care appliance according to claim 1, wherein the actuator is configured to monitor the at least two operational characteristics.

9. The oral care appliance according to claim 8, wherein the actuator triggers a means for varying pressure when the at least one operational characteristic reaches the targeted threshold.

10. A method of controlling pressure in an oral care appliance, the method comprising:
varying pressure inside a cavity to deform a mouthpiece during a brushing cycle, wherein the cavity is formed between the mouthpiece and a dental arch, wherein the brushing cycle comprises at least one contraction phase and at least one relaxation phase of the mouthpiece;
regulating the pressure inside the cavity to control at least one of the contraction phase and the relaxation phase, wherein an actuator is triggered to regulate the pressure inside the cavity when one of at least two operational characteristics reaches a targeted threshold, whichever occurs first; and
wherein the at least two operational characteristics includes a pressure and a time.

11. The method according to claim 10, wherein the pressure inside the cavity is varied by one of: a pump, a depression chamber, and a valve mechanism.

12. The method according to claim 10, wherein the at least one contraction phase and the at least one relaxation phase of the mouthpiece are achieved by increasing or decreasing the pressure inside the cavity.

13. The method according to claim 10, wherein a cleaning agent can be aspirated into the mouthpiece during the brushing cycle.

14. The method according to claim 10, wherein the brushing cycle can be repeated one or more times.

15. The method according to claim 10, wherein the actuator is an electronic system and comprises at least one of a sensor and a timer.

16. The method according to claim 10, wherein the actuator is configured to monitor the at least two operational characteristics.

17. The method according to claim 16, wherein the actuator triggers a means for varying pressure when the at least one operational characteristic reaches the targeted threshold.

18. The method according to claim 10, wherein the actuator additionally controls an injection system able to inject any of a liquid, a solid, or a gas into the mouth of the user.

19. The method according to claim 10, wherein the actuator is triggered to extract waste from the mouthpiece when at least one operational characteristic reaches the targeted threshold.

20. The method according to claim 10, wherein the mouthpiece comprises a flexible membrane configured to deform in response to pressure variations in the cavity.

21. The method according to claim 20, wherein the cavity is formed between the flexible membrane and the dental arch.

* * * * *